3,708,337
CONTINUOUS PROCESS FOR RECOLOURIZING LIQUORS

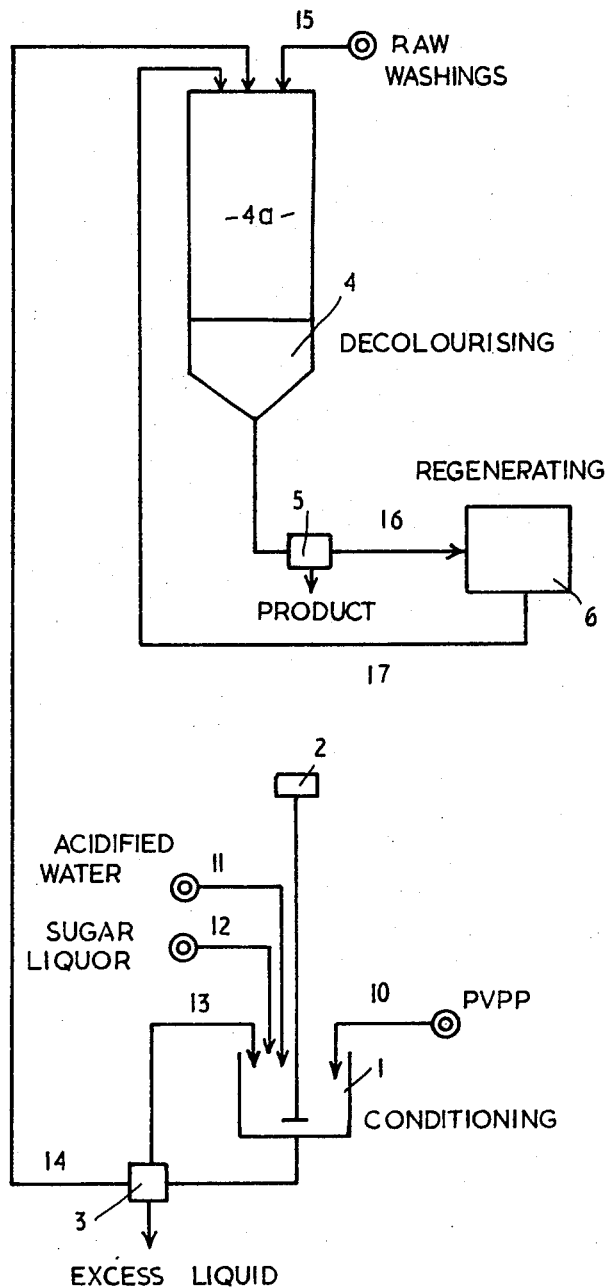

Peter Smith and Herve Suzor, East Roseville, New South Wales, Australia, assignors to The Colonial Sugar Refining Company Limited, Sydney, New South Wales, Australia
Filed Jan. 25, 1971, Ser. No. 109,428
Int. Cl. C13d 3/12
U.S. Cl. 127—46 R      6 Claims

ABSTRACT OF THE DISCLOSURE

A continuous column process for decolourizing an aqueous sugar liquor, in which the sugar liquor is fed downwardly through a floating bed of a flocculent polyamide. The polyamide is assisted initially to float in the liquor by being conditioned in an aqueous liquid, such as water. It has been found that a rate of liquor flow can be regulated such that (i) at least a portion of the bed is maintained generally in suspension, but (ii) particles of spent polyamide are carried away in the colour-reduced effluent (product). The particles of spent polyamide are separated from the effluent outside the column, and the polyamide is then regenerated and returned as required to the top of the floating bed. The polyamides used are water-insoluble, water-swellable and pulverulent (typically, nylon-66 and poly-N-vinyl polypyrrolidones), and cannot be used conventionally in a packed column fitted with a basal retaining plate. The invention is particularly applicable to decolourizing the high density sugar liquors, such as raw washings.

---

This invention relates to a continuous process for reducing the colour content, particularly the phenolic colour content, of aqueous sugar liquors such as the various liquors produced in a sugar manufacturing process, for example raw washings ("affination syrup"), raw sugar solutions and melter liquors. Unless the contrary is clearly expressed, all liquors referred to herein are colour-contaminated.

The term decolourizing as used herein refers to a process leading either to complete colour removal or merely to colour reduction.

In experiments leading up to the invention, it has been observed that the water-insoluble water-swellable pulverulent polyamides (hereinafter sometimes referred to simply as polyamides) have a high affinity for colour factors, particularly the high molecular weight colour factors of phenolic type present in sugar liquors. This observation has suggested the possible use of the polyamides as decolourizing agents for the treatment of such liquors.

The polyamides are exemplified particularly herein by (1) polyhexamethylene polyadipamide (hereinafter referred to as nylon-66); and (2) poly-N-vinyl polylactams, such as the poly-N-vinyl polypyrrolidone known as Polyclar-AT (hereinafter referred to as PVPP). Polyclar is a trademark of GAF Corporation.

It has been known previously that the polyamides can be used to remove tannins from beverages, such as beer and wine. For example, disclosures of this kind regarding the use of PVPP (and, in passing, regarding the use of nylon-66) have been made in United States patent specification No. 3,117,004 (William D. McFarlane et alia). The mentioned specification also describes methods of preparing PVPP and, in this regard, is incorporated herein by way of reference.

Whether the polyamides are to be used for the purpose of removing phenolic colour factors from sugar liquors or for removing tannins from beverages, there must be provision—such as filtration means—for separating the polyamides from the liquids after treatment.

Prima facie, it would appear that in all cases the liquid treatment step and the separation step would be carried out most efficiently as a unit operation in a continuous process using a conventional liquid treatment column packed with the polyamide and fitted with a foraminous basal retaining plate. However, as disclosed in South African patent specification No. 69/4108 (GAF Corporation), PVPP—which is very finely particulate—is not well suited for use in such a column for clarifying beverages such as beer and wine. The disadvantages attending the use of PVPP in this way (extremely long drainage time) can be avoided according to the South African specification by using instead a porous granular form of poly-N-vinyl polypyrrolidone crosslinked with for example divinyl benzene.

We have now found that the type of disadvantage noted when using PVPP for clarifying beverages such as beer and wine—which are of relatively low density—is repeated on a magnified scale when any attempt is made to use this polyamide for the purpose of decolourizing the higher density sugar liquors of a sugar manufacturing process in a packed column fitted with a foraminous basal retaining plate.

Further, we have found that while it is possible to drain colour-free sugar liquors through a liquid treatment column packed with nylon-66 and fitted with a foraminous basal retaining plate, the same is not true when the experiment is repeated but with colour-free liquors replaced by colour contaminated sugar liquors such as raw washings.

In general, we have found that drainage problems are always associated with the water-insoluble water-swellable pulverluent polyamides when used for decolourizing sugar liquors in a column fitted with a foraminous basal retaining plate.

It has been appreciated that the abovementioned difficulties with the pulverulent polyamides owe their origin to a property of pressure-deformability which is manifested inter alia in the presence of colour-contaminated aqueous sugar liquors. In the case particularly of PVPP, the pressure-deformability is clearly associated with the phenomenon of water-swellability discussed below.

When the polyamides are immersed in water for periods exceeding about half an hour, an increase in volume occurs and a fully water-swollen state is attained if the immersion is continued for about one day. The polyamides in this state are sometimes referred to hereinafter as being flocculent, and the process by which they are rendered flocculent is sometimes referred to hereinafter as conditioning. It has been found that 100 g. of PVPP adsorbs in a day about 200 g. of water, of which 170 g. is loosely adsorbed and 30 g. is more tightly bound. On the other hand, 100 g. of nylon-66 adsorbs in a day no more than a total of about 10 g. of tightly bound water. Correspondingly, the volume increase which accompanies conditioning is particularly visible to the naked eye in the case of PVPP, but is much less noticeable in the case of nylon-66.

When the immersing water is drained away, the flocculent polyamide rapidly collapses to a reduced volume approaching that of the untreated polyamide. It is believed in the case of PVPP that the collapsed state results from a loss of the loosely adsorbed water fraction only. Once the polyamide has been rendered flocculent and has subsequently collapsed in this way, it can be converted again rapidly to a flocculent state by re-immersion in another sample of water.

Whatever the reason in any particular case, polyamide particles generally are very sensitive to pressure in the presence of colour-contaminated aqueous sugar liquors and a relatively impervious cake, comprising colour-loaded polyamide, is inevitably formed on a foraminous basal retaining plate when pressure is applied as a result of sugar liquors passing downwardly therethrough.

Once a cake has been formed, it cannot easily be removed without emptying the column and disrupting the entire liquid treatment process. Furthermore, when using PVPP for decolourizing a sugar liquor, the formation of a cake on the basal plate is quite independent of the degree to which the PVPP is spent and of the degree to which the liquor is decolourized. It is therefore clearly wasteful of time and PVPP to operate the process with key regard to the need intermittently to remove the PVPP whenever it has been formed into a cake.

Quite apart from the impracticality above described of attempting to decolourize sugar liquors in this way, such a process would also suffer from the disadvantage—common to most liquid treatment processes using a column fitted with a basal plate—that it could not be conducted in a truly continuous manner. This is because of the fact that, in use, the polyamides become increasingly incapable of adsorbing additional colour factors, and at a certain stage they must either be regenerated or replaced by fresh polyamide.

For all these reasons, the described arrangement is clearly not practical for continuously decolourizing aqueous sugar liquors using the pulverulent polyamides.

It is accordingly a particular object of the invention to provide a continuous column process for using the polyamides to decolourize aqueous sugar liquors and for removing particles of relatively spent polyamide from the column without disrupting the decolourizing process. It will be seen that the process to be described avoids the disadvantages mentioned above, while at the same time taking advantage of the benefits normally characteristic of a continuous column operation.

The process according to the invention relies on the following additional observations and inferences.

(1) The volume changes consequential on immersing the polyamides in an aqueous liquid are paralleled inversely by density changes.

(i) In the case of PVPP, the density of a sample of the non-conditioned polyamide was found to be 1.232 g./cc., while the density of the same sample of polyamide after conditioning was found to be 1.182 g./cc. It follows that the non-conditioned polyamide cannot be suspended, say, as a floating bed, in still liquids which, at the prevailing temperature, have densities less than 1.232 g./cc.; on the other hand, the mentioned sample of conditioned polyamide can be suspended as a floating bed in still liquids which, at the prevailing temperature, have densities greater than 1.182 g./cc.

More particularly, the non-conditioned polyamide cannot be suspended in a still aqueous sugar liquor at, say, 60° C. unless the solids cencentration of the liquor is not less than about 55° Bx. (where solids only sucrose, density 1.236 g./ml.); and the conditioned polyamide cannot be suspended in a still aqueous sugar liquor at 60° C. unless the solids concentration of the liquor is not less than about 46° Bx. (where solids only sucrose, density 1.188 g./ml.).

It is apparent therefore that while the non-conditioned polyamide cannot be suspended in a still aqueous sugar liquor of, say, 50° Bx. at 60° C. (where solids only sucrose, density 1.209 g./ml.), the conditioned polyamide can be suspended in such a liquor at that temperature.

(ii) In the case of nylon-66, the density changes accompanying conditioning are almost as great as in the case of PVPP. For example, a sample of non-conditioned nylon-66 was found to have a density of 1.196 g./cc. while the same sample of nylon-66 after conditioning was found to have a density of 1.160 g./cc.

(2) Quite apart from the improvement in buoyancy achieved by conditioning a sample of the polyamide in water, suspension can also be favoured by effectively reducing the density of the polyamide by using auxiliary flotation aids of a type known per se (for example, buoying up the polyamide by means of gas bubbles).

Contrariwise, suspension can be hindered by imparting a downwards velocity to the liquid. It follows however that, provided a suitably slow flow rate is selected, a bed of polyamide of appropriately low effective density can be maintained in a suspended condition in a column through which a sugar liquor of higher density is caused downwardly to pass.

Clearly, the possibilities of suspension under the described conditions of flow are greater when the polyamide is in a flocculent state.

(3) When a fresh sample of flocculent polyamide is brought into contact with a colour-contaminated sugar liquor, the colour factors become complexed with the polyamide (inter alia, by hydrogen bonding) and the liquor is left in a colour-reduced state.

It has now been found, surprisingly, that this process leads to the gradual collapse of the polyamide from the flocculent state and to a corresponding increase in the terminal velocity of polyamide particles in that liquor.

Interestingly, this increase in terminal velocity is not accompanied by any appreciable increase in the density of the polyamide. For example, while the density of a sample of conditioned nylon-66 was found to be 1.160 g./cc., the density of the sample when fully colour-loaded was found to be 1.192 g./cc. (an increase in density of 2.7%); and while the density of a sample of conditioned PVPP was found to be 1.182 g./cc., the density of the sample when fully colour-loaded was found to be no more than 1.189 g./cc. (an increase in density of 0.6%).

It follows that in the discovery of this increase in terminal velocity lies the possibility of effecting a general classification of polyamide particles in a floating bed according to their degree of colour loading.

It has been found further that, if the flocculent polyamide is suspended as a floating bed in a column through which an influent sugar liquor is caused downwardly to pass, the velocity of flow can be regulated nicely so as to favour the detachment from the bed generally of the most colour loaded particles of polyamide. Once detached, these spent particles can then be carried away, i.e. entrained, in the downwardly moving effluent liquor. This effluent liquor is necessarily colour-reduced with respect to the influent liquor.

(4) For reasons given earlier herein, particles of spent polyamide which have been carried away in the colour-reduced liquor as indicated above, cannot be separated successfully therefrom by filtration if the filter means is not accessible as required for removing (as by mechanical scraping) any deposited layer of caked polyamide. It has been appreciated howerer that, by conducting the decolourizing process in a column with a floating bed of polyamide, and by locating the separation site outside this column, the particles of spend polyamide can be separated from the liquor without disrupting the continuity of the decolouring process. When the separation site is located outside the column, the process of separation can be effected by means other than conventional filtration; for example, it can be effected by centrifugal means.

Based on the above principles, the invention provides broadly a continuous process for decolourizing an aqueous sugar liquor, comprising the steps:

(a) rendering flocculent a water-insoluble water-swellable pulverulent polyamide by immersion in a first aqueous liquid;

(b) suspending particles of the flocculent polyamide as a pervious floating bed in a second aqueous liquid contained in a column having a top inlet and a bottom outlet;

(c) feeding said sugar liquor to the inlet for movement downwardly through the bed whereby to fluidize the bed and to reduce the colour of the liquor, the particles of polyamide becoming progressively and correspondingly colour-loaded; the velocity of throughput of the liquor and the effective density of the flocculent polyamide relative to the density of the liquor at the prevailing temperature being regulated so as
    (i) to maintain at least a portion of the bed generally in suspension, but
    (ii) to enable particles of relatively spent polyamide to be entrained in the colour-reduced liquor;
(d) withdrawing effluent comprising colour-reduced liquor and entrained particles of relatively spent polyamide from the outlet;
(e) separating the entrained particles of relatively spent polyamide from the withdrawn effluent; and
(f) adding as required additional flocculent polyamide to the bed to maintain at least said portion generally in suspension.

It has been found that step (a), wherein the polyamide is rendered flocculent by immersion in an aqueous liquid, is of twofold importance. Firstly, any reduction in the effective density of the polyamide results in the polyamide having a longer residence tme in the floating bed. It follows that—particularly in the absence of auxiliary flotation aids—maximum opportunity should be given to the polyamide to become water-swollen in order to achieve efficiency in the overall decolourizing process. Secondly, it has been found that the capacity for adsorbing colour factors is affected markedly by this step, being typically increased by a factor approaching 2 relative to the capacity of the unconditioned polyamide.

Since hydrogen bonding is involved in the adsorption of colour by the polyamides, it will be understood that the polyamides are most capable of decolourizing sugar liquors when they are in an acid condition. It is preferred therefore to acidify the polyamides at some stage prior to their use for decolourizing according to the invention.

Very conveniently, the polyamides can be brought into a suitable acid condition and can be rendered flocculent in a single step by using an aqueous liquid for conditioning which is acidified water, for example dilute hydrochloric acid.

Obviously, the pH of the acidified water should not be so low that there is a likelihood of inverting an undesirable proportion of sucrose to fructose and glucose when the polyamide is later used for decolourizing a sugar liquor according to the invention. Preferably therefore, the pH of the acidified water is not less than 5.

For maximum swelling to take place, it has been appreciated that the aqueous liquid used for conditioning should not be a sugar liquor of high solids concentration (for example, 60° Bx.). However, since polyamide material which has been immersed only in water or acidified water contains a very significant proportion of loosely adsorbed water (this is particularly true of PVPP), it is desirable as explained below for the polyamide thus conditioned to be treated by immersion in a quiescent aqueous sugar solution before it is used for decolourizing in step (c) of the defined process.

Preferably, the solids content of the quiescent aqueous sugar solution is comparable to that of the sugar liquor to be decolourized. While it is technically desirable for the quiescent aqueous sugar solution to be colour-free, this may not be economically feasible, and it is in fact satisfactory to use instead a portion of colour-contaminated sugar liquor (such as a portion of the liquor to be decolourized). By keeping the temperature low (for example, 20° C.) it can be ensured that the polyamide does not become significantly loaded with colour factors while being treated in this way.

If the polyamide is not immersed in a quiescent aqueous sugar solution before being used for decolourizing in step (c), it is found that the liquor when decolourized in the column becomes unavoidably diluted—to an extent which may be commercially undesirable—by the water loosely adsorbed by the polyamide. Furthermore, because of this dilution, the viscosity of the liquor in the column becomes somewhat reduced, and this has the effect that the polyamide particles may be transported too easily out of the floating bed.

A positive advantage of the mentioned treatment in a quiescent aqueous sugar solution is that the particles of polyamide undergoing treatment tend to aggregate together in a way which is not possible under the conditions of liquor flow in step (c). The terminal velocity of aggregated particles is necessarily less than that of particles which have not aggregated, and it is found accordingly that particles of the former type are transported less easily out of the bed than particles of the latter type. The mentioned treatment in a quiescent aqueous sugar solution thus functions as an aid to flotation.

For the purpose of suspending the flocculent polyamide in step (b), a suitably dense second aqueous liquid must be provided in the column. At the outset of a continuous decolourizing process, the liquid charge in the column conveniently consists of a portion of the sugar liquor to be decolourized. After the process has been in operation however, the liquid in the column necesarily consists of the sugar liquor being decolourized.

It will also be appreciated that, at the outset of the process, the second aqueous liquid can be provided by the mentioned quiescent aqueous sugar solution, i.e. treatment in the latter solution can be conducted in the column. For practical reasons however, it is usually preferred to conduct this treatment outside the column.

Clearly the floating bed of polyamide should be pervious to the sugar liquor being fed to the column, and some mechanical agitation may be required to achieve this when the bed is first formed.

After the bed has been formed, the velocity of throughput of sugar liquor in the column should be regulated so as to maintain at least a portion of the bed generally in suspension in the fluidized condition but to enable particles of relatively spent polyamide to be entrained in the effluent. General considerations relevant to the velocity of liquor throughput are discussed below with respect initially to a colour-free sugar liquor.

In a static system (no downwards flow) the particles of polyamide in a sugar liquor are submitted to a buoyant force only. This force is given by the expression, $$F_b = V.g.(S_p - S_l)$$

where:

$F_b$ is bouyant force;
V is volume of the bed;
$g$ is gravitational acceleration;
$S_p$ is polyamide particle density; and
$S_l$ is liquor density.

In terms of this expression, the polyamide particles are suspended as a bed in such a static system when $S_p < S_l$.

When the liquor is caused to move downwardly through such a bed (dynamic system), a pressure drop occurs across the bed. This pressure drop is given by the expression, $$\Delta P = K.L.v^2 . \frac{(1-\epsilon)^2}{\epsilon^3}$$

where:

$\Delta P$ is pressure drop;
K is an experimentally discoverable coefficient related to frictional force, particle diameter, and density and viscosity of the liquor;
L is bed depth;
$v$ is velocity of the liquor; and
$\epsilon$ is porosity of the bed.

It is well known that the particles of pulverulent polyamide in any sample thereof are widely distributed in size. In the case of PVPP for example, it was demonstrated for a given sample that the mean diameter of the particles was 58.2µ. Nearly all particles of the sample passed through a 36 mesh, but 88% of the particles were caught by a 350 mesh (British Standard Sieve).

As a result of this size distribution, it is found that—for the mentioned dynamic system—there is a certain liquor flow rate range for which a bed of polyamide particles assumes a 2-phase character, viz, a relatively dense (upper) phase and a relatively lean (lower) phase.

Assuming closely packed particles, the lower limit of flow rate at which the bed begins to partake of this dual character obtains approximately when the following condition is met, $$F_b + A \cdot \Delta P = 0$$

where: A is the cross-sectional area of the bed.

This lower limit of flow rate corresponds substantially to the terminal velocity of the smallest particles of the bed. Contrariwise, the upper limit of flow rate corresponds substantially to the terminal velocity of the largest particles of the bed.

At all flow rates within the mentioned flow rate range, particles are entrained preferentially out of the relatively lean phase of the bed in the downwardly moving liquor, and the relatively dense phase of the bed is maintained generally in suspension under such conditions.

Should the liquor flow rate exceed the terminal velocity of the largest particles of the bed, the relatively dense phase of the bed becomes completely destroyed. Under such conditions, all particles begin to be transported out of the bed and no portion of the bed is then maintained generally in suspension. The porosity of such a bed has a value of 1.

In the case of a colour-contaminated sugar liquor, particles of polyamide cannot be immersed therein without adsorbing colour factors. As mentioned earlier herein, it has been found to be a consequence of colour adsorption that the terminal velocity of the particles is increased. For this reason, the particles of polyamide become gradually more transportable out of a bed as they adsorb more colour factors.

Two practical consequences of this are—(i) that a bed which, under the prevailing conditions of liquor flow, consists initially of a relatively dense phase only, will progressively develop a relatively lean phase as colour factors are adsorbed; and (ii) that the relatively dense phase of a bed will become progressively depleted as more and more sugar liquor is passed therethrough. Because of the latter effect, it is necessary continually to add further polyamide to the bed as required to maintain a relatively dense phase generally in suspension.

It is a particular virtue of the invention that, with liquor flow rates regulated to maintain such a portion of the bed generally in suspension, there is found to be a linear relationship between (i) the mass of polyamide material transported out of the bed and (ii) the total colour (considered with respect to the Attenuation Index at 420 mµ pH 9) adsorbed by the polyamide. This is an indication of a highly efficient usage of polyamide in the decolourizing process.

It will be appreciated that the actual liquor flow rates used in the practice of the invention must be selected as a compromise between the two conflicting requirements of (i) the desirability of achieving a high throughput of sugar liquor (favoured by a relatively high flow rate), and (ii) the desirability of not transporting particles of polyamide out of the bed until they are as fully colour-loaded as possible (favoured by a relatively low flow rate). Optimum flow rates which meet the desired compromise can be readily determined experimentally.

It will be understood that very low flow rates are not necessarily incompatible with a high rate of liquor throughput, because the cross-sectional area of the column can be made very great. Methods of controlling flow rate are described below.

According to the invention, effluent comprising colour-reduced liquor and entrained particles of relatively spent polyamide is withdrawn from the outlet of the column and is then submitted to a liquid/solids separation step.

Conveniently, the effluent is discharged via a gooseneck to a conventional separation device, for example a filtration device. By varying the height of the goose-neck below the top of the column, the flow rate of the liquor through the system can be controlled. For example, when the goose-neck discharges at a level just below the top of the column, a very low flow rate is ensured and there is a long contact time with the polyamide bed. Alternatively or additionally, pump means can be included in the system to control the flow rate.

The process according to the invention is a continuous one, colour-reduced liquor and relatively spent polyamide being withdrawn from the column via the outlet and fresh polyamide in a flocculent state being added progressively as required to the top of the bed.

If desired, the process can be carried out in a series of stages, the effluent from one column being led to the top of an adjacent column, the effluent from the latter being led to the top of yet another adjacent column, and so on. Means for intermediate separation can be included between the stages. To maintain the required fluid flow, the series of columns can be arranged in a sequence of decreasing heights, but preferably the fluid flow is maintained instead by pumping means. All the columns are provided initially with floating beds of fresh flocculent polyamide and additional such polyamide is added progressively to one or more of the columns as required.

The temperature at which the process is carried out can be varied within wide limits, the upper limit being determined by the fact that the liquor must always be sufficiently dense to suspend at least a portion of the bed of polyamide under the selected conditions of liquor flow, and the lower limit being determined by the need to carry out the decolourizing step at a commercially satisfactory rate. The optimum temperature for treatment of a sugar liquor of 70° Bx. solids concentration appears to be 80° C.

Spent polyamide from the process can be regenerated by conventional means and used again. A typical regenerating procedure consists in sweetening off the polyamide with water to remove residual sugar and loosely bound colour factors; irrigating with dilute aqueous alkali (for example, 1 N aqueous sodium hydroxide) to remove the more tightly bound colour factors; washing with water to remove the alkali; then reactivating by means of dilute strong acid (for example, 1 N aqueous hydrochloric acid).

The accompanying drawing illustrates schematically an embodiment of the invention in which a single decolourizing column is provided (single stage process).

The selected polyamide, say PVPP, is introduced by line 10 to conditioning vessel 1 fitted with mixer 2. Excess acidified water (say, hydrochloric acid at pH 5) is introduced to the vessel by line 11. After the required conditioning period therein, the flocculent PVPP is separated from excess liquid by filtration at filter 3, and is returned to the vessel by line 13. It is then treated with sugar liquor (say, raw washings) introduced to the vessel by line 12, is again filtered from excess liquid, and is introduced as required by line 14 to an inlet at the top of decolourizing column 4.

Feed liquor (say, raw washings at 80° C.) is introduced to an inlet at the top of the decolourizing column by line 15 and the rate of flow is regulated as previously explained to enable at least a portion of the PVPP to be maintained generally in suspension in the column at the prevailing temperature. The general region of the total floating bed is indicated as 4a. Jacketing means (not shown) is provided as required about the decolourizing column to assist in maintaining the temperature of the liquor while passing therethrough. Alternatively, heating means (not shown) is provided for this purpose.

Effluent withdrawn from the bottom outlet of the column comprises colour-reduced liquor and entrained particles of relatively spent PVPP. The PVPP is separated from the liquor (product) at filter 5, and is then passed by line 16 to regenerating station 6.

The PVPP is regenerated as previously explained by treatment successively with water, dilute alkali, water, and dilute strong acid. The regenerated PVPP is returned to the decolourizing column by line 17.

It will be appreciated that at equilibrium, the entire PVPP requirement for the decolourizing column is met by PVPP coming from the regenerating column.

Further understanding of the principles relied on by the invention will be obtained by reference to the following laboratory experiments relating to the decolourizing of raw washings.

EXPERIMENT 1

A quantity of PVPP (200 g.) was first conditioned by immersing in excess raw washings of 68–70° Bx. at 20° C. for one day. By the end of this time, the PVPP was found to have swollen to a gelatinous caked mass of maximum volume. This was then filtered from the excess raw washings.

A column (diameter 5.08 cm., height 91 cm.) was set up, having an inlet at the top and an outlet at the bottom, and was held by a water jacket at 60° C. The gelatinous caked mass of PVPP was broken up and was suspended as a bed in the column in a further portion of the raw washings at 60° C. A feed supply of the same raw washings at 60° C. was then pumped through the column at a rate of 10 ml./min.

At least a portion of the PVPP bed remained generally suspended in the column throughout the process and colour-reduced effluent liquor was withdrawn from the outlet. Particles of PVPP were lost progressively by the bed as they became relatively spent and were entrained in the colour-reduced effluent liquor. After withdrawal from the column, such particles of spent PVPP were readily separated from the liquor by a conventional filtration method (discharging from a goose-neck into a funnel fitted with a stainless steel gauze).

With respect to the Attenuation Index at 420 m$\mu$ pH 9, the colour of the feed raw washings was 41253. The colour of the effluent liquor was determined at various stages in the throughput of the feed, and the results with respect to the cumulative throughput are given in the following table.

| Colour of Effluent: | Cumulative throughput (litres) |
|---|---|
| 21303 | 1 |
| 17387 | 2 |
| 18642 | 3 |
| 23266 | 4 |
| 31464 | 15.2 |

EXPERIMENT 2

Separate samples (each 25 g.) of PVPP and nylon-66 were first conditioned by immersing in excess water for 8 hours. The pH was then adjusted to 5 by the addition with stirring of a quantity of 0.1 N hydrochloric acid. The flocculent acidified polyamides were filtered to remove excess liquid, and were then treated by immersion in excess colour-free sugar liquor of 66° Bx. for 16 hours. The polyamides were again filtered to remove excess liquid.

Two identical columns (diameter 2.54 cm., height 91 cm.) were set up, having an inlet at the top and an outlet at the bottom, and were held by a water jacket at 80° C. The flocculent polyamide masses were broken up and suspended as beds in the columns in raw washings of 66° Bx. at 80° C. A feed supply of the same raw washings at 80° C. was then pumped through each column at a rate of 0.175 ml./min.

At least a portion of each polyamide bed remained generally suspended in its column throughout the process, and particles of relatively spent polyamide were entrained in the colour-reduced effluent liquor withdrawn from the column. The spent material was recovered from this liquor by conventional filtration and weighed at known cumulative throughputs.

The colour of the effluent liquor was determined for each column at the same cumulative throughputs, and the results with respect to the cumulative throughput of liquor and the cumulative mass of spent polyamide are given in the following table.

In this table, the colour of the effluent liquor is given as the reduced effluent colour, i.e. the ratio of the colour of the effluent liquor to the colour of the influent raw washings (colour being with respect to the Attenuation Index at 420 m$\mu$ pH 9). The cumulative mass of spent polyamide is expressed as a percentage of the total mass of polyamide initially suspended in the column.

| Polyamide | Reduced effluent colour | Cumulative Throughput (ml.) | Spent polyamide (percent) |
|---|---|---|---|
| PVPP | 0.76 | 717 | 13.26 |
| PVPP | 0.80 | 20,34.4 | 98.44 |
| Nylon-66 | 0.79 | 775.3 | 3.20 |
| Do | 0.89 | 1,828.6 | 68.16 |

When the experiment with PVPP was repeated in all respects except that the raw washings was replaced by a colour-free sugar liquor of 66° Bx. (solids provided by sucrose only), it was found that the maximum percentage of PVPP that could be entrained out of the column was 24%.

We claim:
1. A continuous process for decolourizing an aqueous sugar liquor, comprising the steps:
   (a) rendering flocculent a water-insoluble water swellable pulverulent polyamide by immersion in a first aqueous liquid;
   (b) suspending particles of the flocculent polyamide as a pervious floating bed in a second aqueous liquid contained in a column having a top inlet and a bottom outlet;
   (c) feeding said sugar liquor to the inlet for movement downwardly through the bed whereby to fluidize the bed and to reduce the colour of the liquor, the particles of polyamide becoming progressively and correspondingly colour-loaded; the velocity of throughput of the liquor and the effective density of the flocculent polyamide relative to the density of the liquor at the prevailing temperature being regulated so as (i) to maintain at least a portion of the bed generally in suspension but (ii) to enable particles of relatively spent polyamide to be entrained in the colour-reduced liquor;
   (d) withdrawing effluent comprising colour-reduced liquor and entrained particles of relatively spent polyamide from the outlet;
   (e) separating the entrained particles of relatively spent polyamide from the withdrawn effluent; and
   (f) adding as required additional flocculent polyamide to the bed to maintain at least said portion generally in suspension.
2. A process according to claim 1 wherein said first aqueous liquid is selected from the group consisting of water and acidified water having a pH not less than 5.

3. A process according to claim 1 wherein the flocculent polyamide is treated by immersion in a quiescent aqueous sugar solution to remove water loosely adsorbed by the polyamide before said sugar liquor is fed to the inlet in step (c).

4. A process according to claim 1 wherein said additional flocculent polyamide is obtained by regenerating relatively spent polyamide separated in step (e).

5. A process according to claim 1 wherein the polyamide is pulverulent nylon-66.

6. A process according to claim 1 wherein the polyamide is a pulverulent poly-N-vinyl polypyrrolidone.

References Cited
UNITED STATES PATENTS

| | | | |
|---|---|---|---|
| 1,646,079 | 10/1927 | Battelle | 127—9 X |
| 3,479,221 | 11/1969 | Buhl | 127—46 R |
| 3,508,965 | 4/1970 | Harrison | 127—46 R |

MORRIS O. WOLK, Primary Examiner

S. MARANTZ, Assistant Examiner

U.S. Cl. X.R.

210—20